United States Patent [19]
Bender

[11] Patent Number: 6,028,316
[45] Date of Patent: *Feb. 22, 2000

[54] METHOD AND APPARATUS FOR REMOVAL OF MATERIAL UTILIZING NEAR-BLACKBODY RADIATOR MEANS

[75] Inventor: Jim Bender, Foresthill, Calif.

[73] Assignee: New Star Lasers, Inc., Auburn, Calif.

[ * ] Notice: This patent is subject to a terminal disclaimer.

[21] Appl. No.: 08/915,814

[22] Filed: Aug. 21, 1997

Related U.S. Application Data

[63] Continuation-in-part of application No. 08/703,977, Aug. 28, 1996, Pat. No. 5,789,755.

[51] Int. Cl.[7] ............................................. B08B 7/00
[52] U.S. Cl. ............................................ 250/492.1; 134/1
[58] Field of Search ............................. 250/492.1; 134/1

[56] References Cited

U.S. PATENT DOCUMENTS

| | | | |
|---|---|---|---|
| 4,867,796 | 9/1989 | Asmus et al. | 134/1 |
| 5,194,723 | 3/1993 | Cates et al. | 250/205 |
| 5,204,517 | 4/1993 | Cates et al. | 250/205 |
| 5,281,798 | 1/1994 | Hamm et al. | 250/205 |
| 5,613,509 | 3/1997 | Kolb et al. | 134/56 R |
| 5,656,096 | 8/1997 | Van Alstyne | 134/1 |
| 5,751,897 | 5/1998 | Van Alstyne | 392/419 |
| 5,789,755 | 8/1998 | Bender | 250/492.1 |

*Primary Examiner*—Jack I. Berman
*Attorney, Agent, or Firm*—Ray K. Shahani, Esq.

[57] ABSTRACT

An apparatus and method for removal of material from a substrate or structure including a broadband flashlamp-type radiator for providing broadband radiant energy, an ultraviolet radiator, lamp head or other focusing means for directing the broadband radiant energy and ultraviolet radiant energy onto the surface of the coating or coatings or other material to be removed, thereby resulting in the ablation and photodissociation of the material, and a residual constituents removing means, such as flowing $CO_2$ pellets, liquid $CO_2$, jets of compressed air, particles or other flowing gases or liquids. A method of controlling the removal of material from a structure comprising the steps of determining thermal conductivities, densities and heat capacities of the material to be removed, determining a pulse duration of broadband radiant energy, with a bandwidth between about 390 nm and about 1100 nm, required for removal of the desired thickness of material by direct correlation of the pulse duration and thermal conductivity and inverse correlation with the heat capacities and densities of the material, and determining a pulse duration of ultraviolet radiant energy, with a bandwidth between about 150 nm and about 390 nm, required for removal of the desired thickness of material by direct correlation of the pulse duration and thermal conductivity and inverse correlation with the heat capacities and densities of the material.

36 Claims, 10 Drawing Sheets

METHOD AND APPARATUS FOR REMOVAL OF MATERIAL UTILIZING NEAR-BLACKBODY RADIATOR MEANS

RELATED APPLICATIONS

This is a continuation-in-part of U.S. patent application Ser. No. 08/703,977 filed on Aug. 28, 1996, now U.S. Pat. No. 5,789,755.

FIELD OF THE INVENTION

The present invention relates to methods and apparatus for paint-stripping, decoating and other material-removing applications and more particularly to the use of a highly efficient flashlamp or other source of high peak power, high average power, broadband, continuum output radiation for rapidly and efficiently vaporizing the material to be removed, scrubbing the vaporized material and physically displacing the remaining debris.

BACKGROUND OF THE INVENTION

Decoating and paint stripping are specific examples of removing preselected types and amounts of materials from a substrate or structure. Removal of paint from buildings, automobiles, bridges, aircraft and other structures is a very large industry throughout the world. Refurbishment of paint on aircraft, for example, is a matter of routine maintenance with an average coat of paint lasting typically between about 3 and about 5 years. Furthermore, removal or rust and corrosion of all types, including fouling on the undersides of maritime boats and vessels, is also time-consuming, expensive and difficult.

Problems associated with decoating or paint removal are various. In certain instances, recessed or angular areas or areas with otherwise inaccessible surfaces are difficult to treat. Mechanical methods of decoating include manual or assisted sanding and scraping, grinding with an electric grinder, and blasting the surface with particles such as metal or plastic pellets, sand, etc. Drawbacks of these methods include the possible damage to underlying substrate structure. The upper layer of substrate or structure is often slightly pitted or otherwise damaged and stress hardening is known to occur. These changes in substrate or structure integrity or quality can have a negative impact on the function or utility of the structure. For example, smooth flat surfaces are aesthetically pleasing on an automobile's painted surfaces. The design of an aircraft may be based on a given construction material's physical characteristics such as static and dynamic strength, shear strength, or modulus of elasticity, and changing these physical characteristics could have a negative impact on the given material's performance under certain situations.

Chemical methods of removing coatings or other types of materials are similarly fraught with a range of drawbacks. The primary requirement is chemical solubility of the material to be removed and essential insolubility of the substrate or structure—a situation often difficult to achieve. Particular care must be taken when the substrate or structure is plastic or epoxy-based since these and other organic materials are easily affected by certain solvents. Furthermore, chemical processes for decoating, paint-stripping and the like often pose a significant risk to human and animal health and our environment either through direct exposure to employees during the process or during waste treatment and downstream processing, industrial accidents, etc.

Methods and apparatus for removing material, in particular for multi-purpose decoating, stripping or scaling, based upon delivery of broadband, non-coherent electromagnetic energy such as that produced by a Xenon-gas or other type flashlamp for rapidly and efficiently vaporizing the material to be removed is heretofore unknown. Although laser energy has been used to in hundreds of applications to vaporize or ablate all types of materials including metals, human tissue and semiconductors, laser devices are dangerous, expensive and often awkward to use. U.S. Pat. No. 4,867,796 to Asmus et al. discusses a method for photo-decontamination of surfaces in which broad band frequency light absorption agents are admixed into the contaminants which are then irradiated. As with a laser, as the light-absorptive agent absorbs the radiation it becomes hot and vaporizes along with the surface decontaminant.

Numerous methods for controlling a flashlamp-type decoating apparatus have been proposed. U.S. Pat. No. 5,281,798 to Hamm et al. proposes a method and system for selectively removing a material coating from a substrate or structure using a flashlamp in conjunction with a photodetector circuit for sensing reflected light back from the surface being ablated, thereby providing a feedback signal indicative of the reflected color intensity of the surface being ablated. The method is dependent upon a boundary between the coatings or between the coating and the substrate or structure to be distinguished by a visible color change, requires additional optical and processing means for photo-detection and signal processing.

U.S. Pat. No. 5,194,723 to Cates et al. proposes another method for controlling a pulsed light material removal system based upon detection of "photoacoustic signature signals" generated by the ablation of surface material. However, the complicated method requires sophisticated robotics and sensitive photoacoustic hardware for calibration which involves initial scanning of a structure along a predetermined path, detecting the photoacoustic signature signals, determining an updated scan speed functionally related to the detected photoacoustic signals and controlling the scan speed thereby. Furthermore, the method is dependent on the measurement of so-called photoacoustic signature signals which may or may not exist or be detectable at the required operating temperatures and for the broad range of materials for which a flashlamp-type decoating system would be desirable.

In yet another attempt to overcome the problems associated with using pulsed or continuous wave light energy systems for decoating U.S. Pat. No. 5,204,517 also to Cates et al. theorizes a method and system for control of a material removal process using "spectral emission discrimination". This system utilizes, in addition to photoablative light beam radiation from a flashlamp to remove particles from the surface of the substrate or structure, laser light beam radiation which also ablates material at the surface of the coated substrate or structure so that such ablating material generates spectral emission which can be detected with additional tuned photo-optics or sensors without interference from the spectral output of the flashlamp. In all controls schemes for such flashlamp-type decoating systems proposed in the past, complicated optics and sensor equipment including sophisticated and expensive arrays of diodes with required signal processing hardware and software is required.

Thus, broadly, it is an advantage of the present invention to provide a near-blackbody radiator means for removal of material method and apparatus, said near-blackbody radiator means comprising a highly efficient flashlamp or other type high peak power, high average power, broadband, continuum output radiation for rapidly and efficiently vaporizing the material to be removed.

It is a further advantage of the present invention to provide such a method and apparatus which does not contribute to the production of toxic or other chemical waste.

It is a further advantage of the present invention to provide such a method and apparatus which decontaminates or otherwise reduces the removed material to elemental form or other inert, non-reactive, non-toxic, environmentally friendly soot, ash or other form of debris.

Another drawback of the prior art is that no control scheme based upon required pulse duration is available for removing paint, other coatings or other material from a structure. It is an advantage and objective of the present invention to provide a method based on a pulse duration-control scheme for controllably removing predetermined thicknesses of material from a structure.

SUMMARY OF THE INVENTION

The present invention is an apparatus for removal of a layer or material coating a substrate or structure utilizing radiant electromagnetic energy, the apparatus including flashlamp-type broadband, near black-body radiator means providing radiant electromagnetic energy in a pulsed mode, the light energy having a predetermined bandwidth which includes infrared and visible electromagnetic radiation, thereby causing photoablation of the layer of material to be removed by formation of vapor/plasma, which includes volatile organic compounds, and further photodissociation of the vaporized material produced thereby, and means for displacing residual constituents of photoablation and photodissociation from the substrate or structure.

In one embodiment the broadband radiator delivers radiant electromagnetic energy in a pulsed mode at a rate of between about 1 and about 15 pulses per second. In one embodiment the broadband radiator delivers radiant electromagnetic energy at a rate of between about 15 and about 50 kW. In one embodiment the flashlamp has a gas plasma temperature of between about 9,500° K. and about 20,000° K. In one embodiment the flashlamp has a gas plasma temperature of between about 9,500° K. and about 11,500° K. In one embodiment the broadband radiator is a high intensity Xenon gas filled flashlamp. In one embodiment the broadband radiator and the ultraviolet radiator means are a single, high intensity Xenon gas filled flashlamp. In one embodiment the ultraviolet radiator means is a mercury vapor lamp.

In one embodiment the residual constituent removing means comprises flowing cryogenic material. In one embodiment the residual constituent removing means comprises flowing $CO_2$ pellets. In one embodiment the residual constituent removing means comprises flowing liquid nitrogen. In additional embodiments, the residual constituent removing means comprise flowing liquid $CO_2$, flowing liquid water, flowing crystalline water particles or snow, flowing compressed air or other compressed gases or liquids.

A preferred embodiment further comprises a scrubber means for removing volatile organic compounds from the ablated and photodissociated material. A preferred embodiment further comprises a filtration means for removing particulate. In one embodiment the broadband radiator and the ultraviolet radiator means are contained within a lamp head assembly, the lamp head assembly directing radiant electromagnetic energy onto the coating material to be removed, the lamp head assembly also directing ultraviolet radiation into the vapor/plasma to cause photodissociation of the material being removed, the lamp head assembly further comprising vacuum means for displacing residual constituents of ablated and photodissociated material from the substrate or structure. The vacuum means may also serve to capture and contain the flowing $CO_2$ pellets, liquid $CO_2$ or nitrogen, compressed gas, air, liquids or other residual constituent removing means. A preferred embodiment further comprises control means for delivering radiant electromagnetic energy and ultraviolet radiation according to a predetermined timing sequence.

A method for removal of material from a substrate or structure utilizing radiant electromagnetic energy comprises the following steps: (A) providing a flashlamp-type near blackbody radiator means to generate radiant electromagnetic energy with a predetermined radiation bandwidth including infrared and visible electromagnetic radiation; (B) delivering predetermined amounts of both radiant electromagnetic energy and ultraviolet radiation to the at least one layer of material to be removed thereby causing ablation and photodissociation of the material to be removed; and (C) removing the residual constituents of ablated and photodissociated material from the substrate or structure.

Another preferred method of the present invention is based on a pulse duration-control scheme for controllably removing predetermined thicknesses of material from a structure.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENT

Near-Blackbody Radiator Means

In one embodiment of the present invention, a near-blackbody radiator means comprises a high peak power, high average power Xenon-gas filled flashlamp. Such a radiator means is capable of delivering up to 12 MW of peak power with average power up to 50 KW. The use of this type of flashlamp for vaporizing solids and thereby decoating structures in heretofore unknown. Average radiative transfer efficiencies are about 85%, thus most of the radiation is used in the decoating process. The power density of the Xenon-gas plasma inside the lamp is such that a strong continuum output is produces. Depending on the selected pulse duration and input energy, this continuum output has a peak in the near to far UV region. The Xenon-gas plasma temperature, again depending on the selected pulse duration and other factors, can range between about 9,500° K. and about 11,400° K., or between about 9,500° K. and about 20,000° K. The diameter of the plasma is kept relatively small so that conversion efficiencies, particularly in the shorter wavelengths, are maximized.

The term "blackbody" denotes an ideal body which would, if it existed, absorb all and reflect none of the radiation falling upon it, its reflectivity would be zero and its absorptivity would be 100%. Such a body would, when illuminated, appear perfectly black, and would be invisible except its outline might be revealed by the obscuring of objects beyond. The chief interest attached to such a body lies in the character of the radiation emitted by it when heated and the laws which govern the relations of the flux density and the spectral energy distribution of that radiation with varying temperature.

The total emission of radiant energy from a blackbody radiator takes place at a rate expressed by the Stein-Boltzmann (fourth power) law; while its spectral energy distribution is described by Planck's equation, and other empirical laws and formulas. Planck's law, often referred to as the fundamental law of quantum theory, expressing the essential concept that energy transfers associates with radiation such as light or x-rays are made up of definite quanta or increments of energy proportional to the frequency of the corresponding radiation. This proportionality is usually expressed by the quantum formula $$E = h\nu$$

in which E is the value of the quantum in units of energy and $\nu$ is the frequency of the radiation. The constant of proportionality, h, is the elementary quantum of action, or Planck's constant.

The relationship $$E_\lambda d\lambda = \frac{hc^3}{\lambda^5} \frac{d\lambda}{e^{\frac{hc}{k\lambda T}} - 1}$$

is known as Planck's radiation formula, where $E_\lambda d\lambda$ is the intensity of radiation in the wavelength band between $\lambda$ and $(\lambda + d\lambda)$, h is Planck's constant, c is the velocity of light, k is the Boltzmann constant and T is the absolute temperature. This formula describes the spectral distribution of the radiation from a complete radiator or blackbody. This equation can be written in other forms, such as in terms of wave-number instead of wavelength. It may also be written in terms of wavenumber instead of wavelength intensity.

The emissivity of the volume emitter (flashlamp plasma) is hard to estimate because of its strong dependence on temperature, wavelength and depth. Nonetheless, since the plasma reaches thermodynamic equilibrium very quickly during the pulse and the depth, for all practical purposes, and remains nearly constant during the period of equilibrium, the emissivity $\epsilon$ can be described according to wavelength interval. Thus, $\epsilon \geq 0.80[250 \text{ nm} \ldots 400 \text{ nm}], \epsilon \approx 0.85[400 \text{ nm} \ldots 750 \text{ nm}], \epsilon \geq 0.95 [750 \text{ nm} \ldots ]$.

Hence, the express "near-blackbody radiator".

Figure 1A:
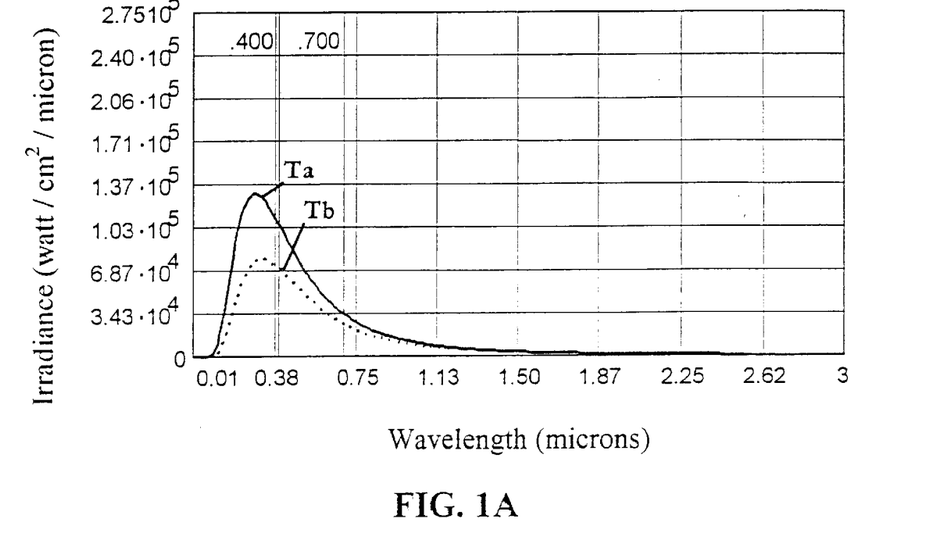
FIG. 1A is a radiation profile showing prior art-radiator means spectral response curves corresponding to two selected plasma temperatures.
Figure 1B:
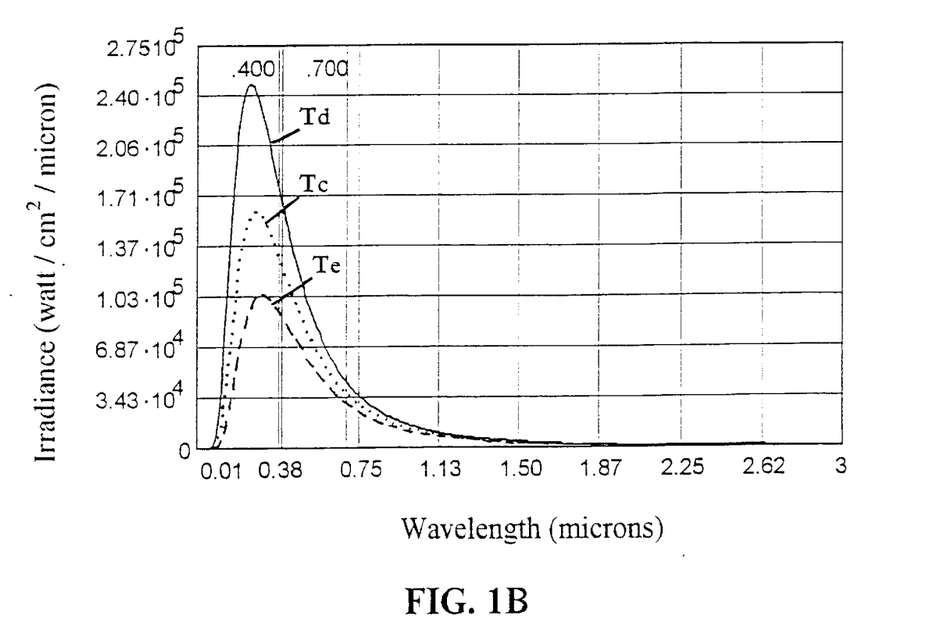
FIG. 1B is a radiation profile showing near-blackbody radiator means spectral response curves corresponding to three selected plasma temperatures.

FIG. 1A is a radiation profile showing prior art-radiator means spectral response curves corresponding to two selected plasma temperatures. FIG. 1B is a radiation profile showing near-blackbody radiator means spectral response curves corresponding to three selected plasma temperatures. It will be shown that the plasma temperatures are determined by pulse duration. By specifying only the pulse duration, the spectral response and radiative intensities can be controlled. Input energy to the lamp can also be controlled. By selecting appropriate pulse duration and input energy, a selective decoating burst of energy can be attained for virtually any type of coating and substrate or structure.

The flashlamp-type near-blackbody radiator means of the present invention is designed to handle pulse durations in the range of about 250 $\mu$s to about 2000 $\mu$s. The flashlamp is designed to withstand these pulse durations over a long life and providing pulse to pulse reliability. As described herein, generally the type of substrate or structure present will dictate the length of pulse most efficient and efficacious.

The area bound by the blackbody curves denotes the total blackbody irradiate as a function of temperature, or R(T). In FIG. 1A, the curves represent the following typical prior art radiator plasma temperatures:

$Ta = 10,026°$ K.

$Tb = 9,060°$ K.

In FIG. 1B, the curves represent the following near-blackbody radiator plasma temperatures for the present invention:

$Tc = 10,456°$ K.

$Td = 11,403°$ K.

$Te = 9,589°$ K.

A typical range of significant utility is between about 9,500° K. and about 11,500° K. It will be made clear hereby that these temperatures are only representative and that temperatures as high as 20,000° K. and greater are included herein. Therefore, in general, to achieve a higher plasma temperature, for a given power rating, the application of shorter pulses of energy will be useful. Radiative heat transfers are proportional to differences in temperature to the fourth power, or $$q \, T^4 - T^4$$

Based on the largest temperature differential between the selected temperatures of a near-blackbody radiator, $\Delta T = 1814°$ K., but the ratio Td/Te is equal to 1.189, that is Td is 1.189 times greater than Te. Thus, total blackbody irradiate, R(T), is $(1.189)^4$ or about 2 times greater than the irradiate generated at Te. This large increase in heat flux from a relatively small increase in plasma temperature is easily attained through predetermined temporal pulse shaping via the pulse forming network (PFN) circuit of the system.

The following comparison between typical flashlamp-type decoating radiator and the flashlamp-type near-blackbody radiator of the present invention will serve to contrast the overwhelming advantages to using the latter. With respect to the flashlamp radiator and operating parameters of the prior art, two typical pulse durations, in seconds, will be analyzed:

$t_a = 0.001200$ s; $t_b = 0.001800$ s or $$t_a = 1200 \text{ }\mu s; \text{ } t_b = 1800 \text{ }\mu s.$$

The electron temperature $T_e$ of the resulting gas plasma inside the lamp is a function of the input energy $E_0$, the inside surface area of the lamp A and pulse duration $t_x$ and is given by the formula $$T_e = \left(\frac{0.9 E_0}{\sigma A t_x}\right)^{\frac{1}{4}}$$

where $\sigma$ is the Stein-Boltzman constant equivalent to $5.67 \times 10^{-12}$ watt/cm$^2$/K$^4$. Thus, utilizing a lamp with an inside diameter of 5 mm and an input energy of 1,800 joules, it can be shown that $$Ta_e = 10,026° \text{ K. and } TB_e = 9,060° \text{ K.}$$

In comparison, utilizing a flashlamp-type near-blackbody radiator of the present invention having a slightly larger inside diameter of 10 mm, an input energy of 3,750 joules and selecting much shorter pulse durations such as $$t_c = 339 \text{ }\mu s; \text{ } t_d = 480 \text{ }\mu s; \text{ and } t_e = 679 \text{ }\mu s,$$

it can be shown that $$Tc_e = 11,403° \text{ K.; } Td_e = 10,456° \text{ K.; and } Te_e = 9,589° \text{ K.}$$

Total blackbody irradiate, a function of the pulse duration and the electron plasma temperature, is given by the formula $$Rt_x(Tx) = \sigma Tx_e^4$$

The following irradiances are typical of the prior art flashlamp radiator:

$$Rt_a(Ta_e) = 57,296 \text{ watt/cm}^2; \text{ } Rt_b(Tb_e) = 38,197 \text{ watt/cm}^2.$$

The following irradiances are possible using the flashlamp-type near-blackbody radiator of the present invention:

$$Rt_c(Tc_e) = 95,856 \text{ watt/cm}^2; \text{ } Rt_d(Td_e) = 67,781 \text{ watt/cm}^2; \text{ and } Rt_e(Te_e) = 47,928 \text{ watt/cm}^2.$$

Thus, much higher total irradiances, i.e., the radiation from the emitter due solely to excitation of the plasma-gas particles, by using shorter pulse durations and higher input energy can now be achieved.

Furthermore, the total power density of the lamp, i.e., the total power emitted by the lamp, including radiation from the emitter as well as thermal energy, will be given by the formula $$Px_p = \frac{E_0}{t_x A}$$

Solving for radiators of the prior art, $$Pa_p = 63,662 \text{ watt/cm}^2; \text{ } Pb_p = 42,441 \text{ watt/cm}^2.$$

and solving for near-blackbody radiators of the present invention, $$Pc_p = 106,507 \text{ watt/cm}^2; \text{ } Pd_p = 75,312 \text{ watt/cm}^2; \text{ and } Pe_p = 53,253 \text{ watt/cm}^2.$$

Decoating Apparatus

Figure 2:
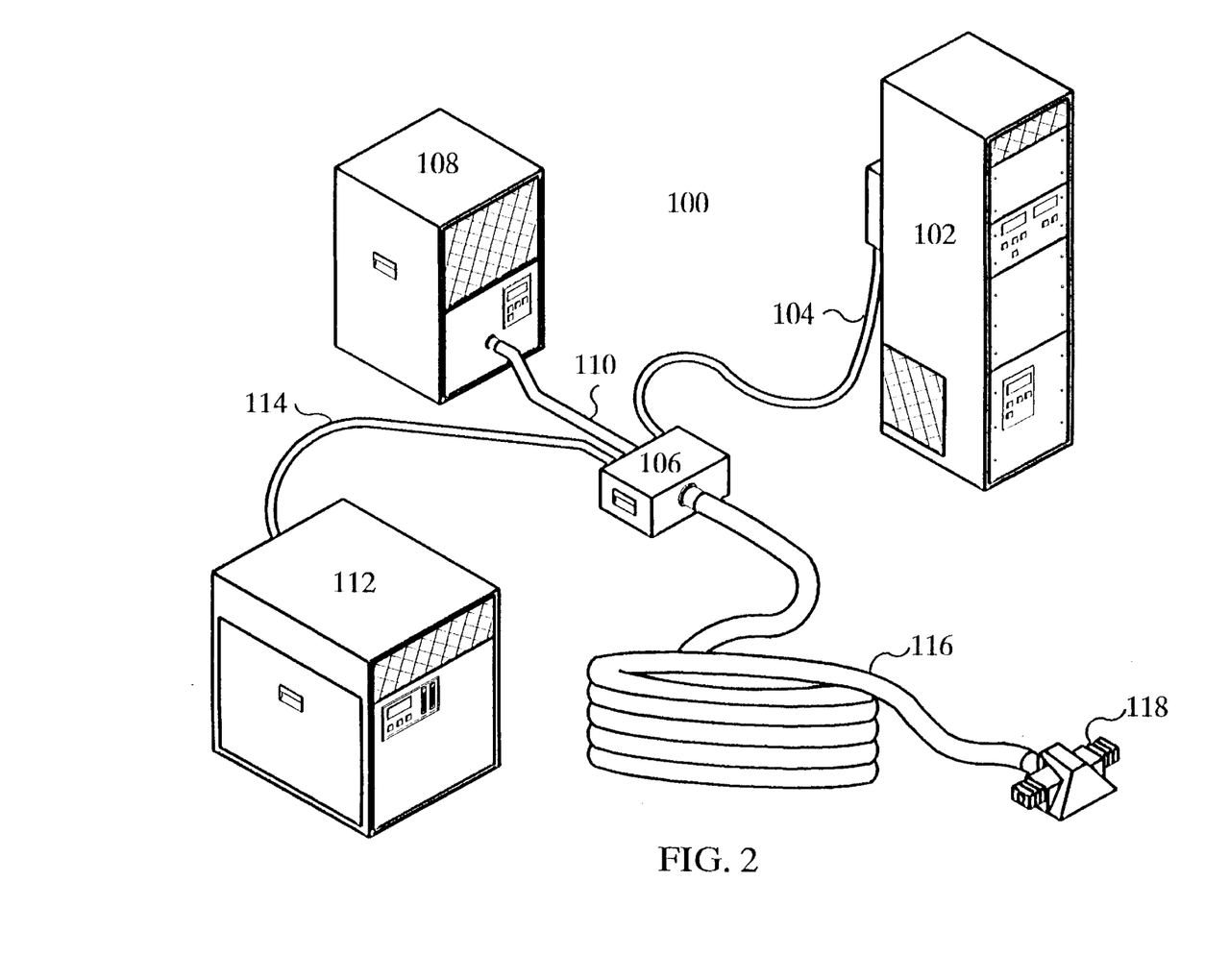
FIG. 2 is a representative perspective view of a preferred embodiment of the near-blackbody radiator means decoating system of the present invention.

FIG. 2 is a representative perspective view of a preferred embodiment of the near-blackbody radiator means decoating system of the present invention. The decoating system 100 is powered by power supply 102. The power supply comprises an approximately 15 to 50 kilowatt charging supply, pulse forming network means, controller means, and electronics cooling system, all contained within a cabinet. A power cable 104 leads to distribution box 106. A source of residual constituents removal means 108 is connected to distribution box 106 via hose 110. It will be understood that such residual constituent removal means 108 includes, but is not limited to, flowing pelletized or liquid $CO_2$, flowing liquid water, flowing crystalline water particles or snow, flowing compressed nitrogen, air or other compressed gases or liquids. Additionally, other particles including plastic pellets, sand, or other conventionally used particles may be used. Vacuum source/HEPA filter and VOC scrubber means 112 is connected to distribution box 106 with vacuum hose 114. An integrated, central umbilical cable 116 leads from distribution box 106 to mounted or hand-held lamp head assembly 118.

The decoating system is designed to be hand held. However, it will be understood that the present invention may be adapted to applications and mounted to a moving member or fixed and stationary relative to a moving surface being decoated. For tall structures such as oil tanks, aircraft, tall walls or supports, etc., where the weight of the umbilical increases with height, a block and tackle pulley system can be installed to counter-balance it's weight. Lack of adequate hangar gantry, bridge support or other can be overcome by erecting a free-standing support.

Figure 3:
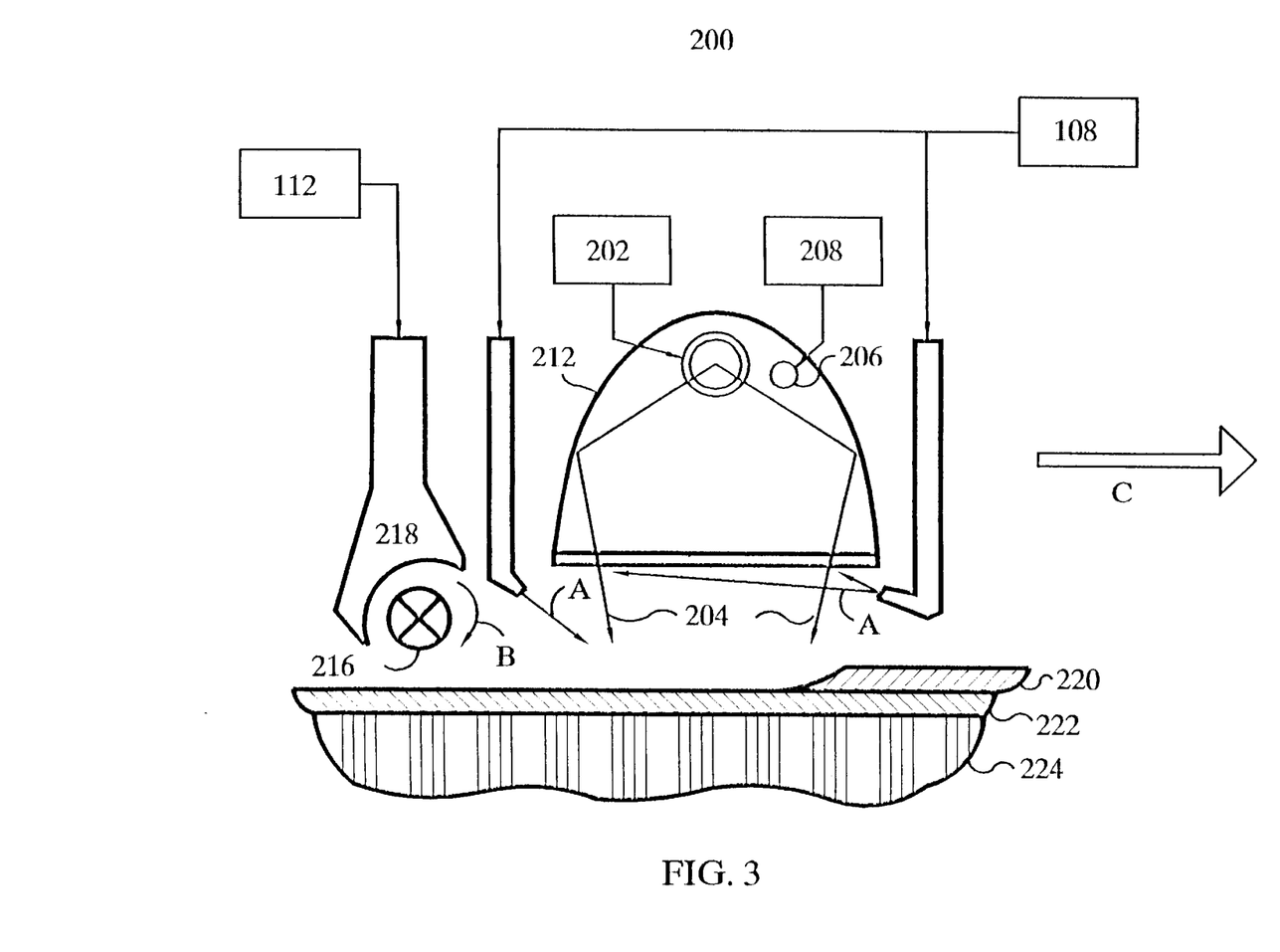
FIG. 3 is a representative schematic view of a preferred embodiment of the lamp head assembly of the present invention.

FIG. 3 is a representative schematic view of a preferred embodiment of the lamp head assembly 118 of the present invention. Near-blackbody radiator means 200 such as an adapted flashlamp is the source of noncoherent, broadband light used to vaporize the coating material being removed. The radiator means is controlled by flashlamp driver 202. The radiator means produces radiation beams 204 which are directed onto the surface of the coating being removed. A preferred embodiment of the radiator means comprises a flashlamp with a nitrogen port 206 in the lamp cavity supplied with a source of nitrogen 208. A quartz plate 210 and reflector 212 separate the radiator means from the structure being decoated.

As the top coating is vaporized, jets 214 blast the residual constituents removal means materials 108, such as compressed air, gases, liquids, etc. onto the work surface as well as onto the quart plate in the directions shown by arrows A to remove the layer of fine ash produced by the device. A light buffing wheel 216 removes any remaining ash or soot or other debris created by the vaporized removed material which all eventually is sucked up in the direction shown by arrow B and removed completely through vacuum nozzle 218 which is supplied by vacuum source 112. Thus, the coating of material to be removed 220 is vaporized as the device is translated over the surface of the coating to be removed in the direction shown by arrow C leaving behind zero, one or more intermediate layers 222 which coat substrate or structure 224. It will be understood that the device can be used to decoat substrate or structures having one or more layers of coating material, one of more of these coating layers to be removed by the process, as desired.

Figure 4:
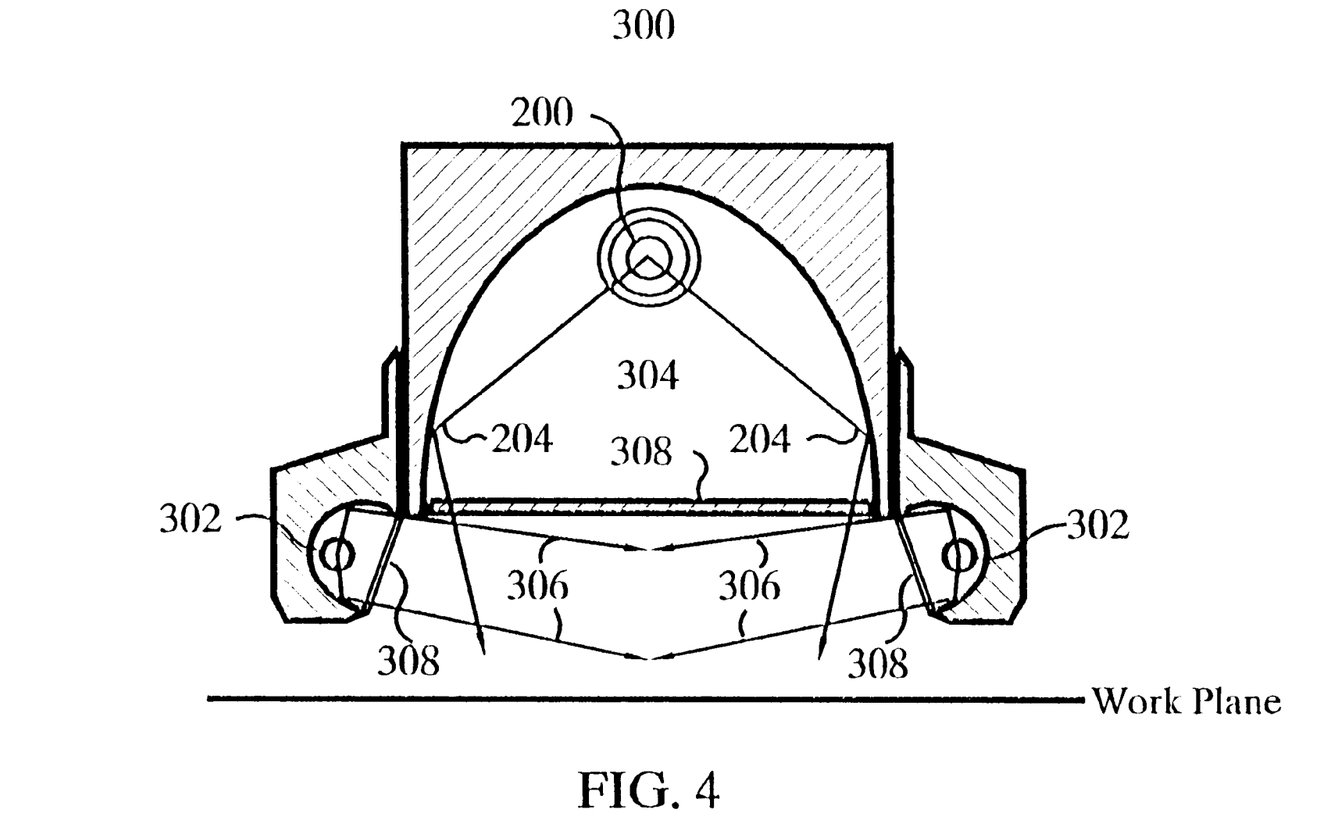
FIG. 4 is a representative schematic view of a preferred embodiment of the lamp head assembly of the present invention.

FIG. 4 is a representative schematic view of a preferred embodiment of the lamp head assembly 300 of the present invention. To further enhance the decoating method of the present invention, a plurality of linear mercury vapor ultraviolet (UV) lamps 302 are placed at the bottom of the main reflector cavity 304 so as to irradiate the vapor/plasma plume with UV radiation 306 continuously. As will be discussed below, this adaptation will aid in the photochemical destruction of the large organic molecule vapors, plasma or particulate disrupted by the major high energy flux of flashlamp type or other broadband radiator 200. An adapted quart plate 308 or other protective system is useful.

The hand-held lamp head assembly has one or more handles. In one embodiment, the lamp head assembly has two ergonomically designed handles, each with a lamp firing trigger. Two triggers are used to insure that the system cannot fire accidentally if one trigger should be accidentally depressed. On one or more handles or elsewhere on the assembly is a set of thumb or otherwise activated controls. A preferred embodiment comprises a small annunciator panel located in the center of the lamp head assembly at an ergonomically chosen location so that the operator can easily survey the instantaneous operating parameters of the system.

The following control can be provided by a number of different means, as described above, including thumb switches.

1. Power settings: Typically, 15 pps (Pulses per second) at 50 KW average power (time limited) can be selected. A default setting of 4 pps at 15 KW average power, rated for continuous duty.
2. Residual constituent material removal means flow-interlock override control: This switch, while depressed or otherwise activated, initiates flow of $CO_2$ pellets, compressed gases, liquids or other residual constituent materials removal means regardless of the interlock state.
3. Vacuum control—ON/OFF: With a default setting Off, the control is provided for convenience. Typically, once the vacuum is turned OFF, then the flashlamp and constituent material removal means flow is disabled. In use lamp shutters for the mercury UV lamps are closed.
4. Mercury UV lamp ON/OFF: Default setting is ON.
5. Mercury UV lamp shutter OPEN/CLOSED: This control is used to override the typically three minute lamp warm up period on the lamp start is avoided. Default setting is CLOSED.
6. Lamp head assembly dwell-interlock override: This feature enable the lamp head assembly to dwell over a certain surface area, while fully activated, when depressed or otherwise manually asserted.

The front of a preferred embodiment of the lamp head assembly has the vacuum nozzle and debris brush mounted directly to it. In this configuration the lamp head assembly is designed to be drawn towards the operator rather than away. The $CO_2$ pellets, compressed gases, liquids or other residual constituent materials removal means 108 are directed at an angle towards the quartz plates while other nozzles are directed at the substrate or structure. The $CO_2$ pellets, compressed gases, liquids or other residual constituent materials removal means 108 are applied in a series of pulses in-between the flashlamp pulses. This is to allow all wavelengths to reach the work surface with minimum attenuation. There is also a protective skirt surrounding the lamp head assembly, near the lower portion, to help create a negative pressure region via the vacuum system, to contain or otherwise capture toxic materials generated by the ablative process.

It is important to note that the angle at which the quartz plates are placed relative to the incident light from the near flashlamp-type black-body radiation means must be considered in light of the wavelengths of light being generated and the index of refractivity of the plate itself. Furthermore, while the $CO_2$ pellets, compressed gases, liquids or other residual constituent materials removal means 108 would otherwise pose no significant attenuation of the short UV wavelengths, they must be directed at the quartz plate in a predetermined angle in order to prevent the build up of soot or other debris which would itself cause significant attenuation of all wavelengths generated in the process.

Figure 5:
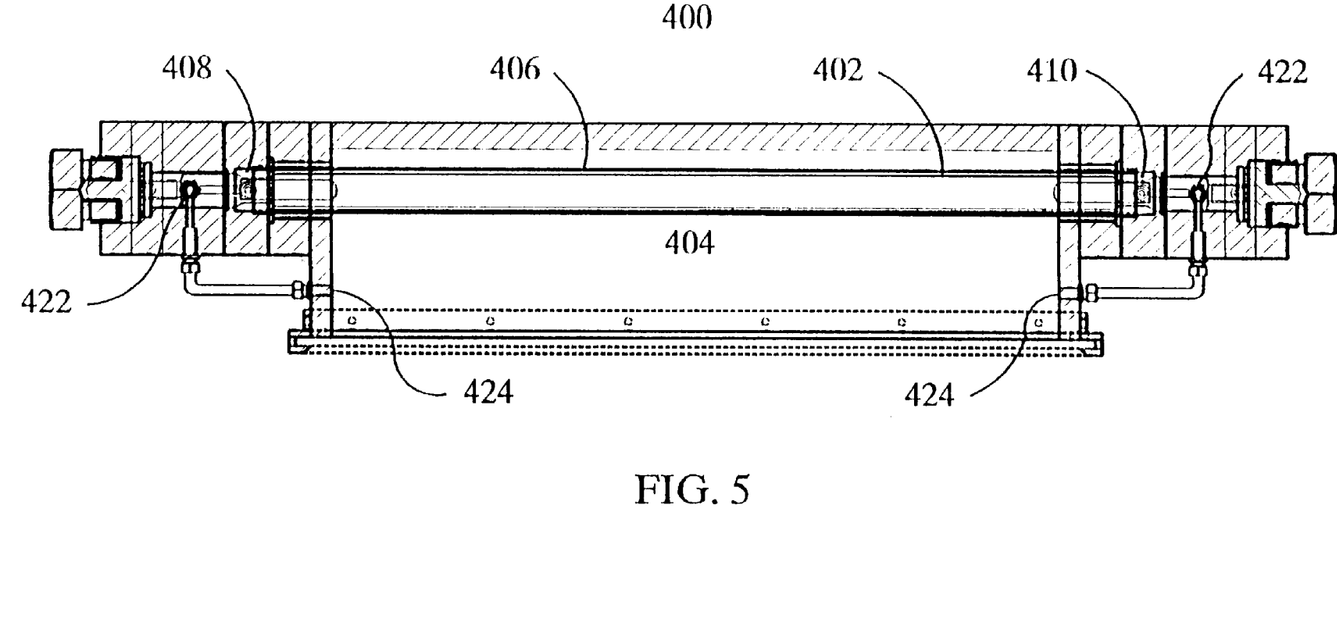
FIGS. 5–7 are representative cross section front, top and side views, respectively, of a preferred embodiment of the near black-body radiation means lamp head assembly of the present invention.
Figure 6:
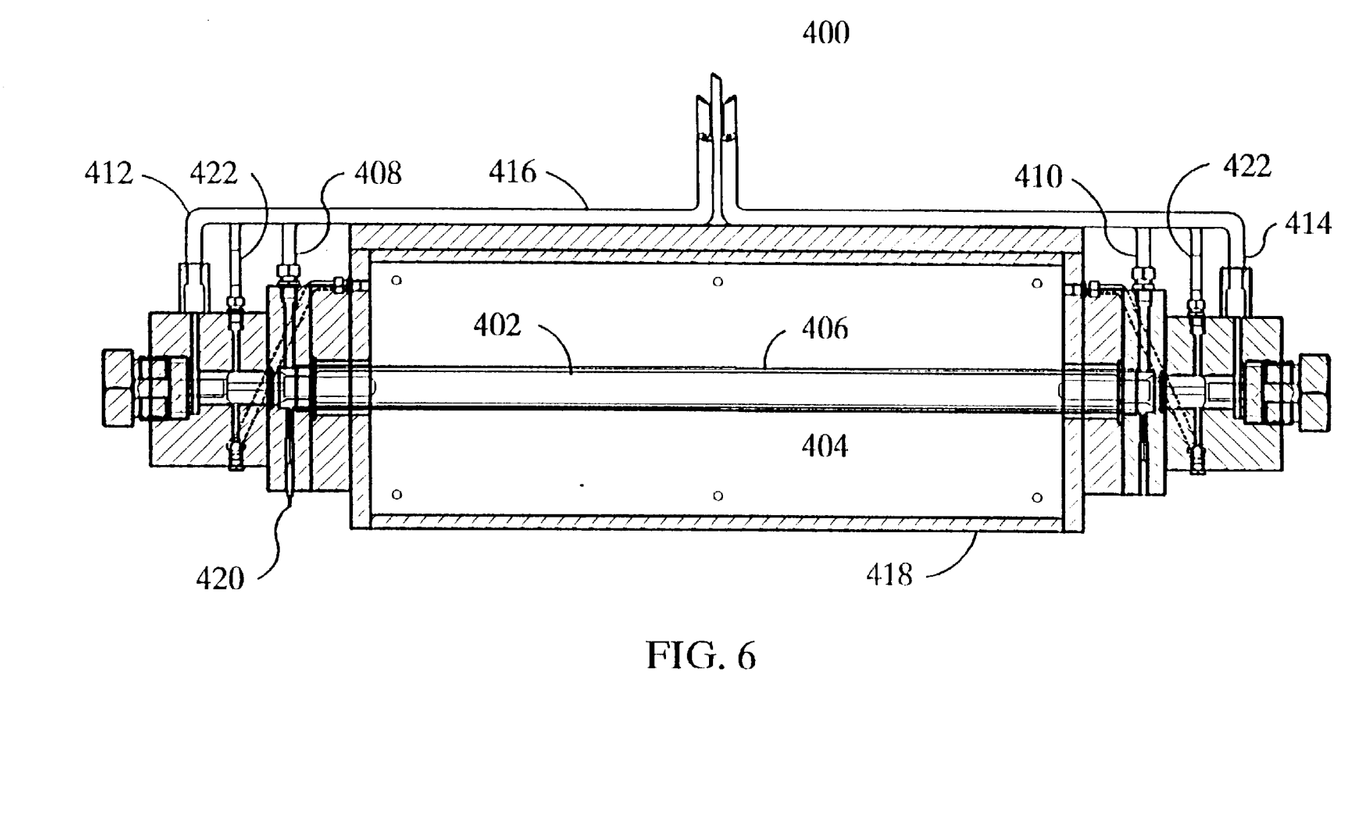
Figure 7:
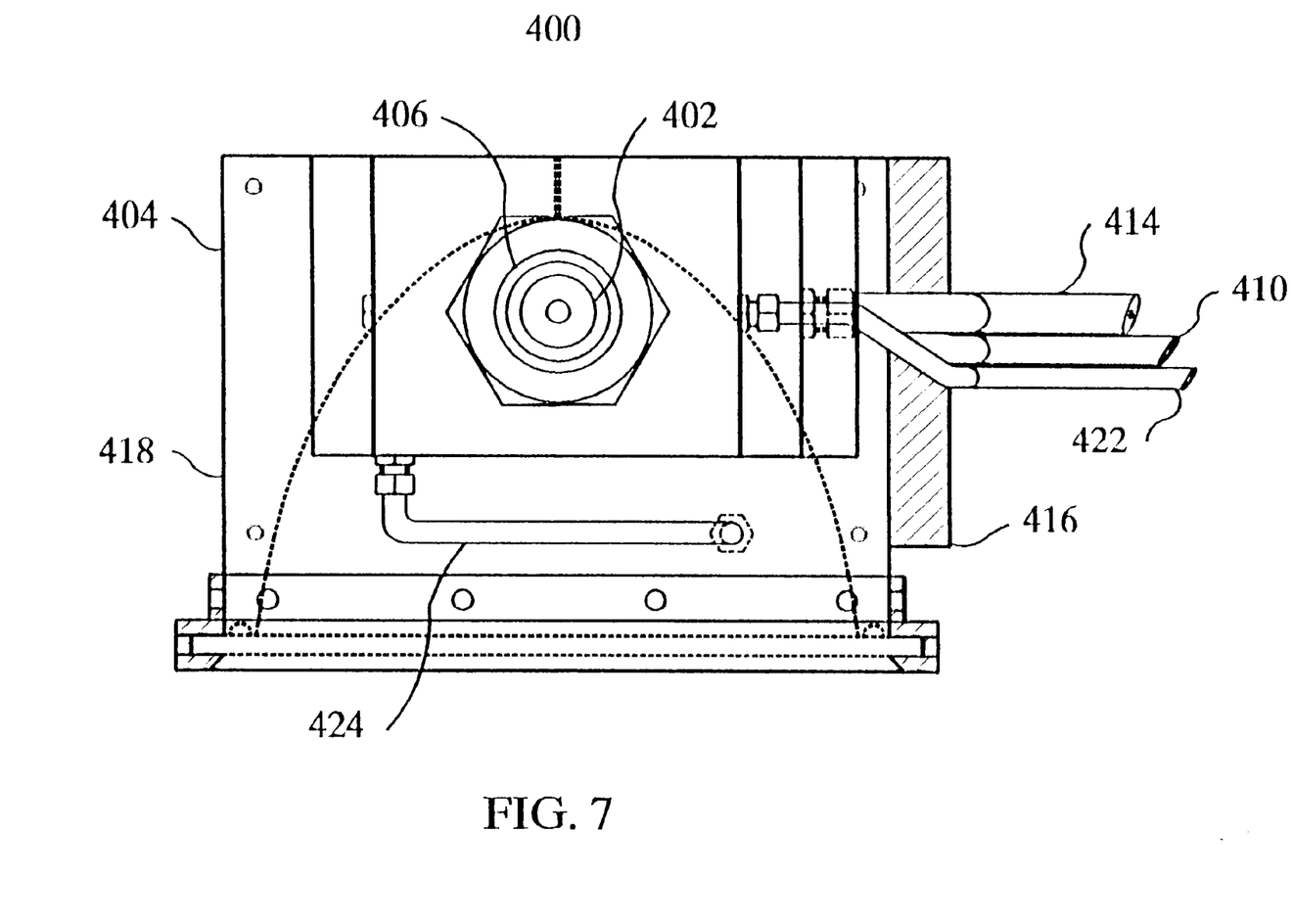

FIGS. 5–7 are representative cross section front, top and side views, respectively, of a preferred embodiment of the near black-body radiation means lamp head assembly 400 of the present invention. As shown, the lamp tube 402 of the assembly sits inside the reflector cavity 404. The lamp tube 402 is disposed within flow tube 406. Cooling water is circulated through the flow tube, entering the assembly through input ports 408 and exiting through output port 410. Anode lead 412 and cathode lead 414 extend from either end of the lamp tube and are directed around the assembly to the rear 416 of the assembly to avoid interference with operations at the front 418 of the assembly during operation. Lamp trigger 420 can be placed as shown or elsewhere. Nitrogen gas is pumped into the reflector cavity 404 through input port 422 and is allowed to escape through output port 424.

Safety interlocks are provides to ensure that the vacuum and scrubber system is activated if the flashlamp and/or mercury vapor UV lamps are running so that dangerous levels of ozone or other contaminants do\not build up in the work area. An interlock is provided to ensure that there are no ground faults present in the lamp head assembly or anywhere else. Also, there is a monitoring system to reduce the applied energy or to stop the flashlamp entirely if the dwell time on a particular spot exceeds some preset reference value. This system will protect the substrate or structure from overheating, from cold stress or mechanical damage from excessive bombardment by $CO_2$ pellets, compressed gases, liquids or other residual constituent materials removal means 108. In one embodiment, the system measures the movement of the lamp head assembly from sensors in the tracks that the lamp head assembly glides on.

Preferred Methodology

Figure 8:
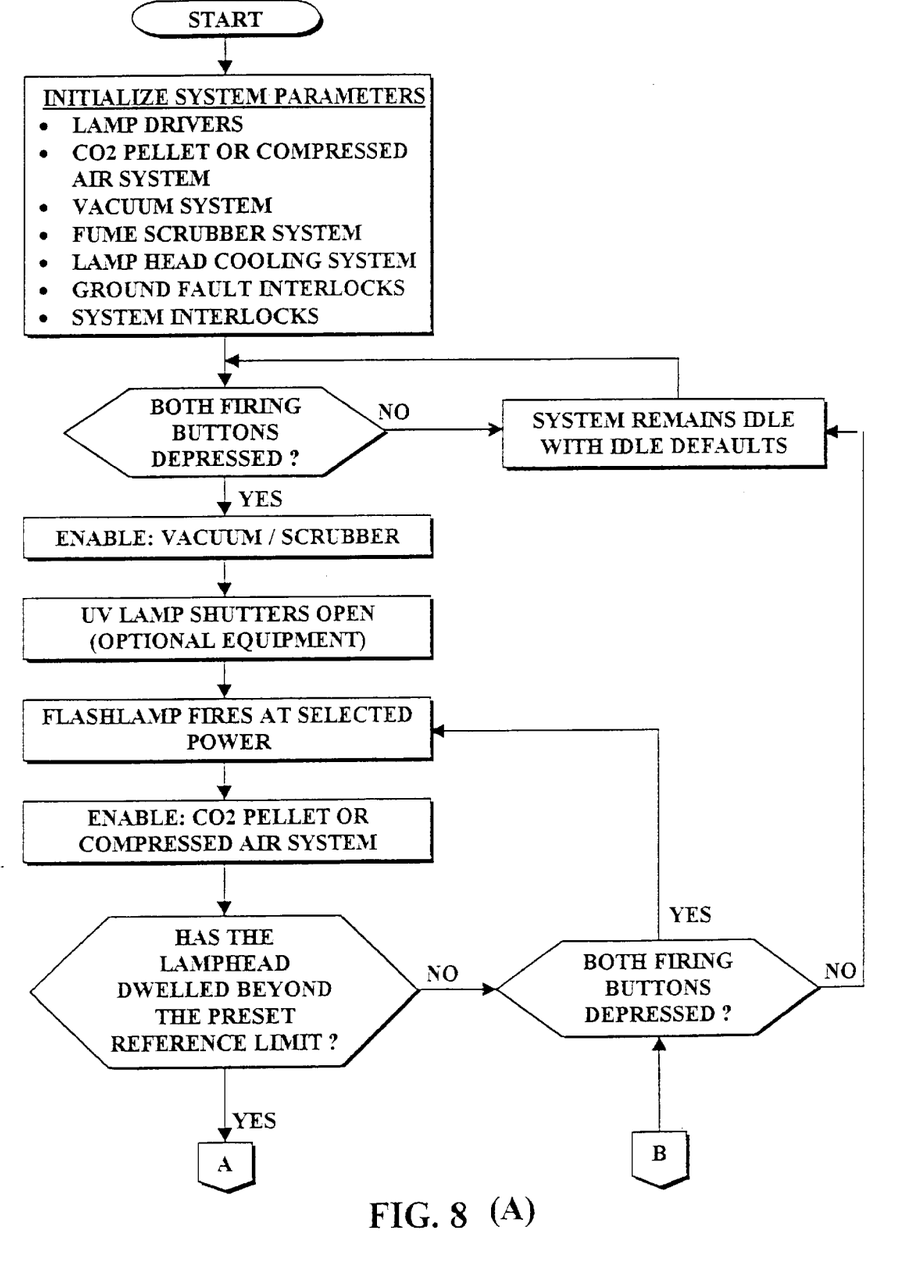
FIGS. 8(A) and 8(B) are a flowchart of a preferred embodiment of the method of the present invention.

FIGS. 8(A) and 8(B) are a flowchart of a preferred embodiment of the method of the present invention. During the first step, sub-system parameters are input into the control means and the various sub-systems are initialized. These individual sub-systems include the lamp drivers, the $CO_2$ pellets, compressed gases, liquids or other residual constituent materials removal means 108 delivery system, the vacuum system, the VOC scrubber and dissociation system, ground fault interlocks and other system interlocks, as described above and as will be expanded by those skilled in the art. Subsequent to initialization, the system is ready for operation. Control means ensure that both firing buttons are depressed manually and simultaneously to ensure intentional operation. Failure to depress both firing buttons will allow the system to remain idle in a state according to default parameters.

Once both buttons are depressed simultaneously, the residual constituent vacuum and effluent gas scrubber and filtration systems are enabled. If so equipped, the UV lamp shutters are opened. Thereafter, the near black-body radiator flashlamp will fire at the selected power at a preset, predetermined pulse rate for a predetermined amount of time. Following the firing of the flashlamp, the subsystem controlling the $CO_2$ pellets, compressed gases, liquids or other residual constituent materials removal means will be enabled.

After allowing the lamp head assembly to dwell in a certain position for a predetermined reference limit amount of time, a timing circuit disables the power supply to the flashlamp. In one mode, the timing circuit disables the flashlamp drivers after a preset reference limit. In another mode, the timing circuit ensure continuous motion at a predetermined rate, thus controlling the power flux rate. After the flashlamp drivers are disabled, the $CO_2$ pellets, compressed gases, liquids or other residual constituent materials removal means is also disabled.

A second timing circuit determines whether the lamp head has moved sufficiently to satisfy a minimum dwell threshold. If not, the flashlamp and $CO_2$ pellets, compressed gases, liquids or other residual constituent materials removal means systems are maintained in a disabled sate. If so, the flashlamp and material removal systems are enabled again and the first timing circuit is activated to determine lamp head dwelling in the new position for the preset reference limit.

Phase I: Initial Vaporization and Ablation

In Phase I of a preferred method of the present invention, the radiator means delivers a pulse having a predetermined duration, power rating and frequency spectrum. A thin layer of the coating material or other material to be removed is vaporized or ablated by the radiation. This thin layer is typically on the order of between about 3 and about 4 mils (thousandths of an inch). Radiant energy in the approximately 400 nm to approximately 10 $\mu$m wavelength range is used to vaporize the upper layer of material to be removed, and is therefore referred to as the vaporization bandwidth (VBW) energy. A resultant vapor/plasma intermediate is produced. In many cases this resultant intermediate will be opaque to VBW energy. In such cases, further irradiation with VBW energy, as with subsequent pulses, will lead to an increase in the temperature of the vapor/plasma. Care must be taken so as not to increase the temperature of this vapor/plasma excessively such that thermal energy in the form of heat is transferred to the substrate or structure or lower, non-removed layers.

As stated previously, the vaporization process is different for different coatings and substrate or structures. However, temporal manipulations and in some cases manipulation of the input energy levels into the radiator means or flashlamp are usually all that need to be made to effectively remove the particular coating from the particular substrate or structure. Typical compounds or coatings which can be effectively ablated using the methods and apparatus of the present invention include polyurethane based paints, and polyamide or other type epoxy based primers, protective coatings, etc. Typical substrate or structures include wood, low or high carbon steel, virtually all typical or specialized types of metal, cement and concrete, carbon and durametallic composites and fiberglass or other non-carbon fiber and epoxy based composite substrate or structures. Greater success is achieved when the substrate or structure has a relatively high thermal conductivity compared with that of a coating to be removed. With a substrate or structure with a low thermal conductivity, as in a non-carbon fiber epoxy based composite, irreparable thermal damage can be done if too much VBW energy is delivered to the vapor/plasma layer. Materials with a relatively higher thermal conductivity will withstand greater thermal energy transfer and will dissipate the heat through the material more easily, which heat would otherwise build up at the surface of the substrate or structure.

Figure 9:
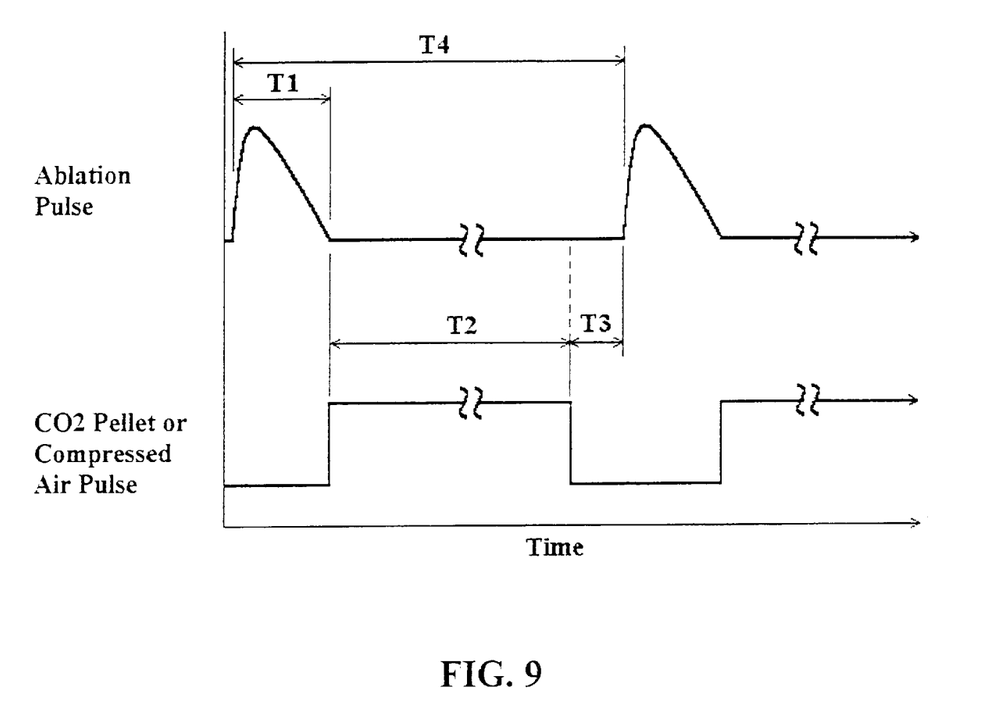
FIG. 9 is a typical timing diagram of a preferred method of decoating of the present invention.

FIG. 9 is a typical timing diagram of a preferred method of decoating of the present invention. Representatively, T1 is the pulse duration of the flashlamp. Typically, this pulse ranges from between about 300 $\mu$sec to about 600 $\mu$sec, depending on the surface to be decoated. T2 represents the relative time that the $CO_2$ pellets, compressed gases, liquids or other residual constituent materials removal means are applied to the surface. As is apparent by the drawing, initiation of delivery of such removal means is delayed until just after or simultaneous with the termination of a lamp pulse. Delivery of $CO_2$ pellets, compressed gases, liquids or other residual constituent materials removal means is sustained until just before the start of the next flashlamp pulse. The interval T3 must be long enough to allow the vacuum system to evacuate the $CO_2$ pellets, compressed gases, liquids or other residual constituent materials removal means from the surface to be ablated. T3 is typically between about 10 milliseconds and about 200 milliseconds. Finally, the pulse repetition or cycling rate T4 ranges from about 4 to about 15 pulses per second, or about 250 to about 66 milliseconds per pulse. This timing protocol can be achieved utilizing microprocessor based programmable or pre-programmed controllers and associated hardware for actuating the flashlamp drivers, removal means system drivers, etc., and will be known to those skilled in the art.

Phase II: VOC Scrubbing

In Phase II of a preferred embodiment of the present invention, further if not complete combustion of the volatile organic compounds (VOCs) is achieved by bombardment of the vapor/plasma layer with ultra-violet (UV) portions of irradiation spectrum. These portions are referred to as the scrubber bandwidth (SBW) which covers a range of between about 180 and about 390 nm. During pulsing of the near-blackbody radiator means, in particular those pulses subsequent to initial Phase I vaporization and ablation, the vapor/plasma layer which is otherwise partially opaque to VBW energy will be exposed to a high energy flux of UV light. This vapor/plasma layer is at least partially transparent to UV light which will cause photo-dissociation of any organic compounds, including VOCs. Furthermore, catalytic action on suspended metals such as Ti, Pb, Cr and their various oxides, etc. will aid in the complete combustion of these compounds.

An increase in the thermal energy based upon absorption of infrared and other frequency light will elevate the fraction of those organics with energies in excess of the activation energy necessary to ionize or dissociate organic molecules. This increase in temperature coupled with heterogeneous catalytic action of the suspended metallics which will actually help to lower the required activation energies of those organic species provides a very efficient and complete scrubbing of the vaporized material which has been removed from the substrate or structure. Furthermore, rapid combustion accomplished via essentially instantaneous vaporization followed by scrubbing will help to dissipate any excess heat generated and will avoid dumping that excess radiant energy into the vapor/plasma layer, reducing the chance of overheating the substrate or structure.

In preferred embodiments, an auxiliary UV radiation means will simplify an otherwise more complicated radiation pulse/dissociation cycle protocol. To further enhance the Phase II ablation process, one or more linear mercury vapor UV lamps are placed at the bottom of the main reflector cavity so as to irradiate the vapor/plasma plume continuously. This adaptation aids in the photochemical destruction of the large organic compounds liberated during the ablative process. The UV lamps are designed to produce discrete atomic line UV radiation. The principle bandwidth ranges from between about 150 nm to about 500 nm, which enhances the photodissociation of organic molecules released by ablation. One mechanism of this photodissociation is based on catalytic reaction with the metallic substrate or structure, e.g. solid-phase aluminum, or with suspended metallic and metallic oxide particulate containing coating materials when present. These lamps also produce a great amount of ozone gas. This gas production also aids in oxidation and other forms of degradation of organic molecules.

Phase III: Removal and Trapping

Following Phase I and Phase II, a layer which comprises a fine ash, soot or other essentially inert, inorganic and/or metallic debris is formed. This fine ash or other form of residual constituents must be removed from the work surface as well as from the outer surface of the quartz plate. This is achieved by blasting both surfaces with $CO_2$ pellets, compressed gases, liquids or other residual constituent materials removal means. Individually oriented jets blast the quartz plate and the work surface and a buffing wheel following the blasting will effectively remove all significant amounts of this ash or other debris. The debris can conveniently be displaced through capture by a vacuum system, the vacuum nozzle placed at the rear of the apparatus. The debris or other effluents can then easily be sent through a strainer, filter, micro-filtration system and/or through an activated carbon scrubbing matrix, to trap the waste for disposal or reclamation.

Furthermore, the vacuum system in combination with the phase transition of the liquid or solid $CO_2$ or other material from solid to gas will safely remove the ozone gas from the work area. As is well known, UV lamps are efficient ozone producers. Ozone, along with any contaminants and the other constituents of the ablated vapor/plasma plume, is then scrubbed by catalytic or other chemical methods in the high efficiency particulate arresting (HEPA) filter/vacuum system. To ensure that no dangerous ozone is produced or released around personnel operating the equipment, the vacuum/plasma fume scrubber is interlocked with the lamp drivers. This interlock system will prevent firing of the flashlamp circuit without adequate vacuum operation and can be tied to electronics of the two systems, auxiliary sensors to monitor vacuum operation, or manually or otherwise.

Pulse Duration-Control

Therefore, if the correct operating parameters of the flashlamp are selected, pulse duration can be used for independent control of the device. A thin layer of unionized gas on the order of a few molecules thick exists between the un-affected structure and the "floor" of the hot gas/plasma layer (q.v., vapor layer). This layer acts as an insulator on the surface of the structure, and the surface is actually somewhat "cooled".

Additional cooling may be used, but in preferred methods of the present invention, residual material is removed without heat generation in the structure itself. Additional complications due to excessive cryogenic cooling of the structure can be avoided by interlocking cooling and radiant power against excessive dwell time.

The novelty of the approach of the present invention is based upon the use of pulse duration as the independent control of ablation depth. The depth of ablation and hence its heat penetration into the coating varies directly with the pulse duration and thermal conductivity of the coating material and other structural components, and inversely with the heat capacity and density of the coatings, substrates and other materials involved. Thus, independently controlling pulse duration, given a set of parameters including power and energy, etc., can be used to control ablation depth.

Unless defined otherwise, all technical and scientific terms used herein have the same meaning as commonly understood by one of ordinary skill in the art to which this invention belongs. Although any methods and materials similar or equivalent to those described can be used in the practice or testing of the present invention, the preferred methods and materials are now described. All publications and patent documents referenced in this application are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. An apparatus for removing material from a structure comprising:
   a broadband radiator for generating radiant energy with wavelengths between about 390 nm and about 1100 nm;
   an ultraviolet radiator for generating radiant energy with wavelengths between about 150 nm and about 390 nm;
   means for directing the radiant energy onto the material for ablation and photodissociation of the material by formation of a material vapor/plasma; and
   means for displacing residual constituents of ablation and photodissociation from the structure.

2. The apparatus of claim 1 in which at least a portion of the radiant energy is generated in a pulsed mode.

3. The apparatus of claim 2 in which the pulsed portion of radiant energy is generated at a rate of between about 1 and about 15 pulses per second.

4. The apparatus of claim 1 wherein the broadband radiator generates radiant energy at a rate of between about 15 and about 50 KW.

5. The apparatus of claim 1 wherein the radiant energy is produced by at least one gas filled flashlamp having a gas plasma temperature of between about 9,500° K. and about 20,000° K.

6. The apparatus of claim 1 wherein the radiant energy is produced by at least one gas filled flashlamp having a gas plasma temperature of between about 9,500° K. and about 11,500° K.

7. The apparatus of claim 1 wherein the broadband radiator is a high intensity Xenon gas filled flashlamp.

8. The apparatus of claim 1 wherein both the broadband radiator and the ultraviolet radiator are a single, high intensity Xenon gas filled flashlamp.

9. The apparatus of claim 1 wherein the ultraviolet radiator is a mercury vapor lamp.

10. The apparatus of claim 1 wherein the residual constituents removing means comprises a flowing cryogenic material.

11. The apparatus of claim 1 wherein the residual constituents removing means comprises flowing $CO_2$ pellets.

12. The apparatus of claim 1 wherein the residual constituents removing mean comprises flowing $CO_2$ liquid.

13. The apparatus of claim 1 wherein the residual constituents removing means comprises flowing liquid nitrogen.

14. The apparatus of claim 1 wherein the residual constituents removing means comprises flowing compressed gas.

15. The apparatus of claim 1 wherein the residual constituents removing means comprises flowing compressed air.

16. The apparatus of claim 1 wherein the residual constituents removing means comprises jets of compressed air.

17. The apparatus of claim 1 wherein the residual constituents removing means comprises a flowing liquid.

18. The apparatus of claim 1 wherein the residual constituents removing means comprises flowing particles.

19. The apparatus of claim 1 further comprising a scrubber means for removing volatile organic compounds from the ablated and photodissociated material.

20. The apparatus of claim 1 further comprising a filtration means for removing particulate.

21. The apparatus of claim 1 wherein the broadband radiator and the ultraviolet radiator means are contained within a lamp head assembly, the lamp head assembly directing the radiant energy onto the material being removed, the lamp head assembly also directing ultraviolet radiant energy into the material vapor/plasma to cause photodissociation of the material being removed.

22. The apparatus of claim 1 further comprising vacuum means for displacing residual constituents of ablated and photodissociated material from the structure.

23. The apparatus of claim 1 further comprising control means for delivering broadband radiant energy and ultraviolet radiant energy according to a predetermined timing sequence.

24. A method for removal of material from a structure using radiant energy, the method comprising the following steps:

providing broadband radiant energy from a flashlamp-type radiator with a bandwidth between about 150 nm and about 1100 nm;

delivering a predetermined amount of broadband radiant energy with a bandwidth between about 390 nm and about 1100 nm to the material;

delivering a predetermined amount of ultraviolet radiant energy with a bandwidth between about 150 nm and about 390 nm to the material, thereby causing ablation and photodissociation of the material to be removed; and removing the residual constituents of ablated and photodissociated material from the structure.

25. The method of claim 24 in which at least a portion of the radiant energy is delivered to the material in a pulsed manner.

26. The method of claim 24 in which removal of the residual constituents of ablation and photodissociation is achieved using flowing cryogenic material.

27. The method of claim 24 in which removal of the residual constituents of ablation and photodissociation is achieved using flowing $CO_2$ pellets.

28. The method of claim 24 in which removal of the residual constituents of ablation and photodissociation is achieved using jets of compressed air.

29. The method of claim 24 in which removal of the residual constituents of ablation and photodissociation is achieved using flowing liquid.

30. The method of claim 24 in which removal of the residual constituents of ablation and photodissociation is achieved using flowing gas.

31. The method of claim 24 in which removal of the residual constituents of ablation and photodissociation is achieved using flowing solid particles.

32. The method of claim 24 further including the step of cooling at least a portion of the structure prior to delivering radiant energy to the material.

33. The method of claim 24 further including the step of cooling at least a portion of the structure subsequent to delivering radiant energy to the material.

34. The method of claim 24 further including the step of cooling at least a portion of the structure contemporaneously with delivering radiant energy to the material.

35. A method for controlling removal of material from the surface of a structure with radiant energy comprising the following steps, in combination:

determining thermal conductivities, densities and heat capacities of the material to be removed;

determining a pulse duration of broadband radiant energy, with a bandwidth between about 390 nm and about 1100 nm, required for removal of the desired thickness of material by direct correlation of the pulse duration and thermal conductivity and inverse correlation with the heat capacities and densities of the material; and determining a pulse duration of ultraviolet radiant energy, with a bandwidth between about 150 nm and about 390 nm, required for removal of the desired thickness of material by direct correlation of the pulse duration and thermal conductivity and inverse correlation with the heat capacities and densities of the material.

36. A method for removal of a desired thickness of material from the surface of a structure with radiant energy comprising the following steps, in combination:

determining thermal conductivities, densities and heat capacities of the material to be removed;

determining a pulse duration of broadband radiant energy required for removal of the desired thickness of material by direct correlation of the pulse duration and thermal conductivity and inverse correlation with the heat capacities and densities of the material;

determining a pulse duration of ultraviolet radiant energy required for removal of the desired thickness of material by direct correlation of the pulse duration and thermal conductivity and inverse correlation with the heat capacities and densities of the material;

providing at least one pulse of broadband radiant energy with a bandwidth between about 390 nm and about 1100 nm to the material to be removed having the determined pulse duration;

providing at least one pulse of ultraviolet radiant energy with a bandwidth between about 150 nm and about 390 nm to the material to be removed having the determined pulse duration, thereby causing ablation and photodissociation of the material to be removed; and removing any residual constituents of ablated and photodissociated material from the structure.

\* \* \* \* \*